United States Patent Office 3,188,021
Patented June 8, 1965

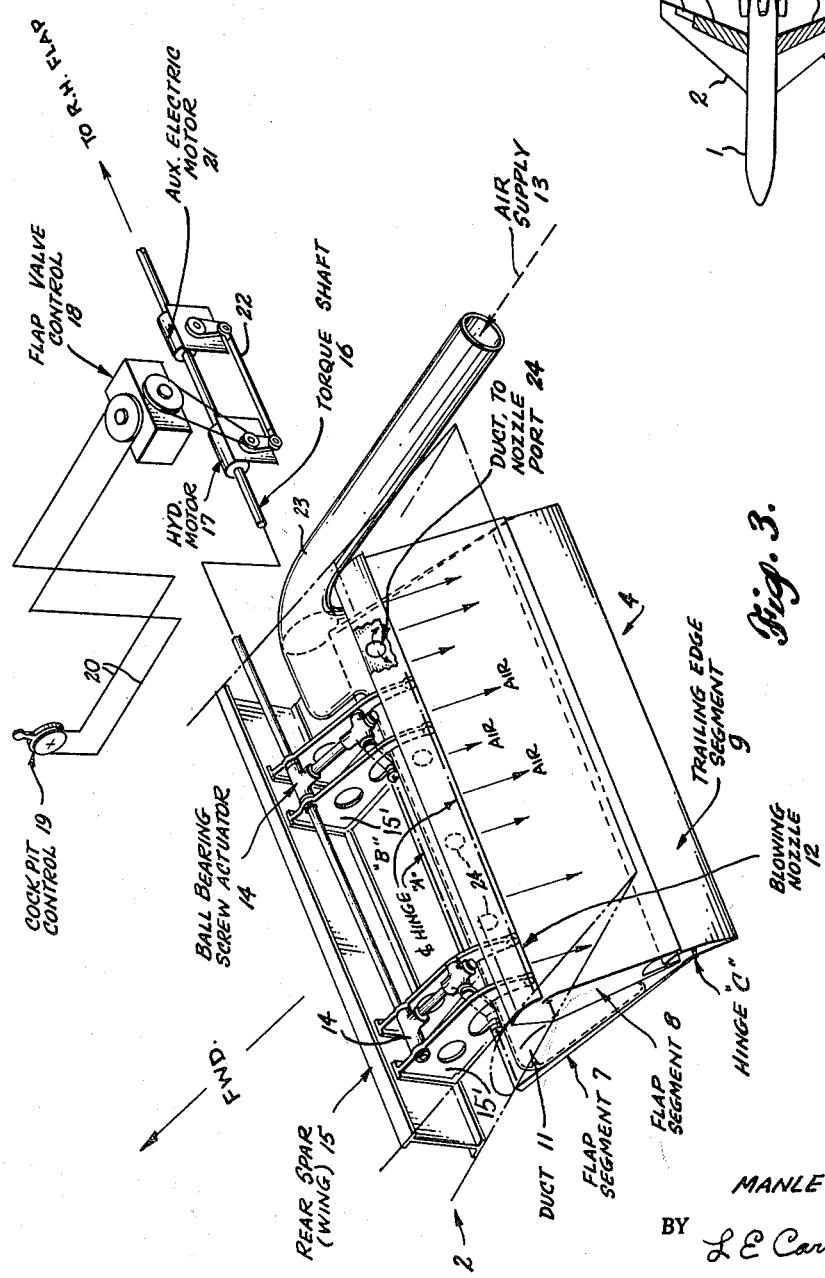

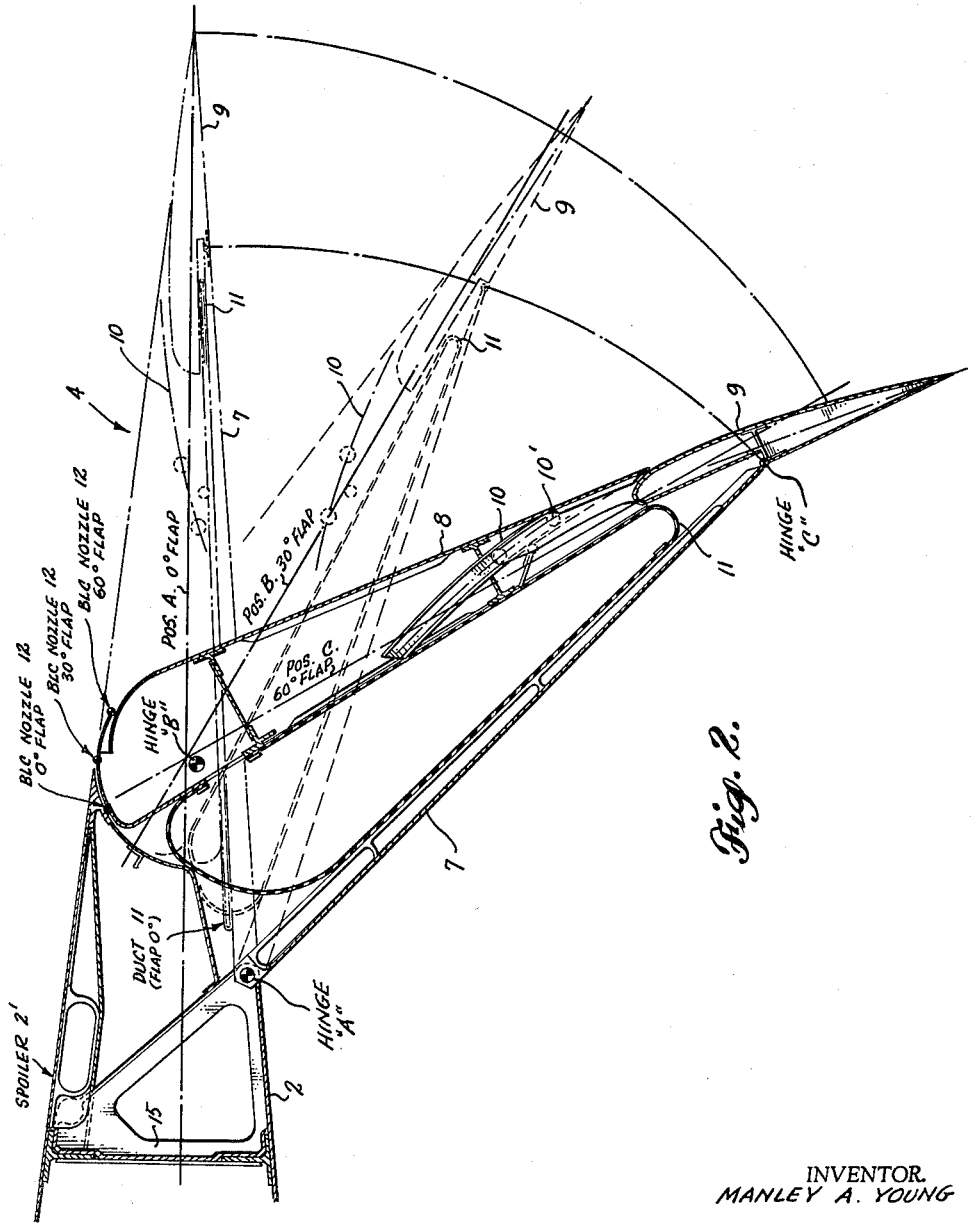

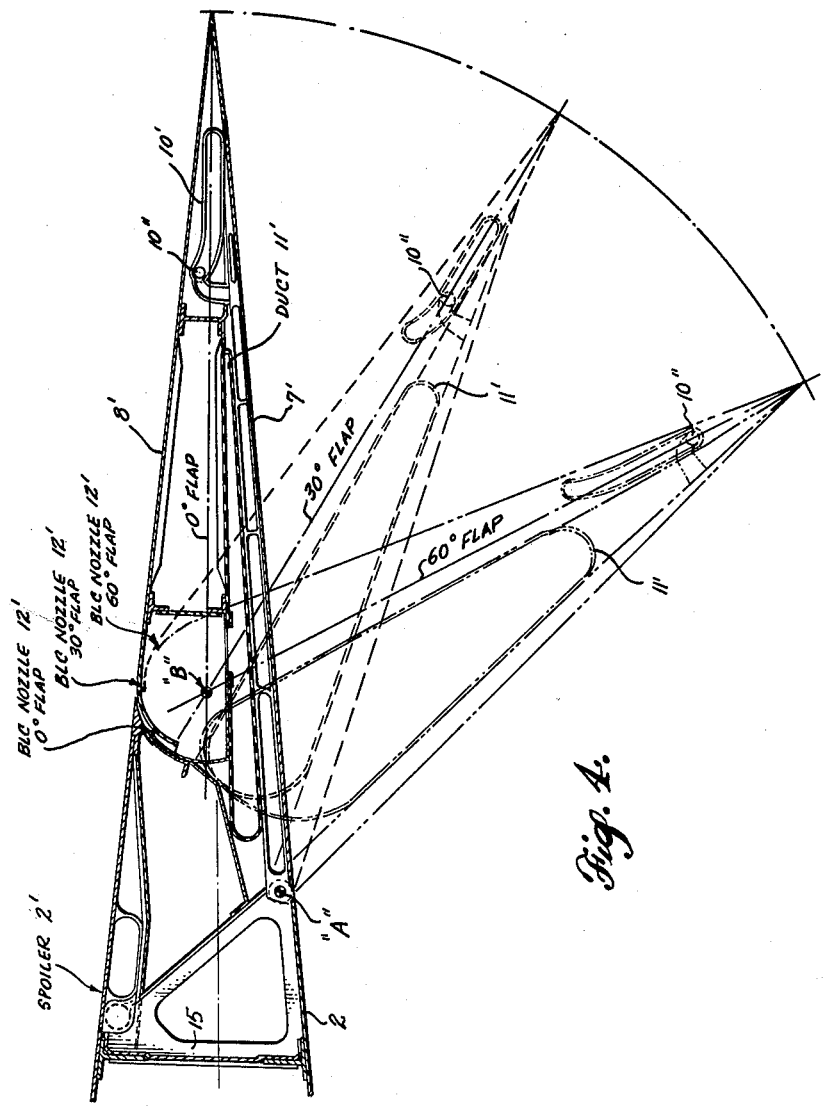

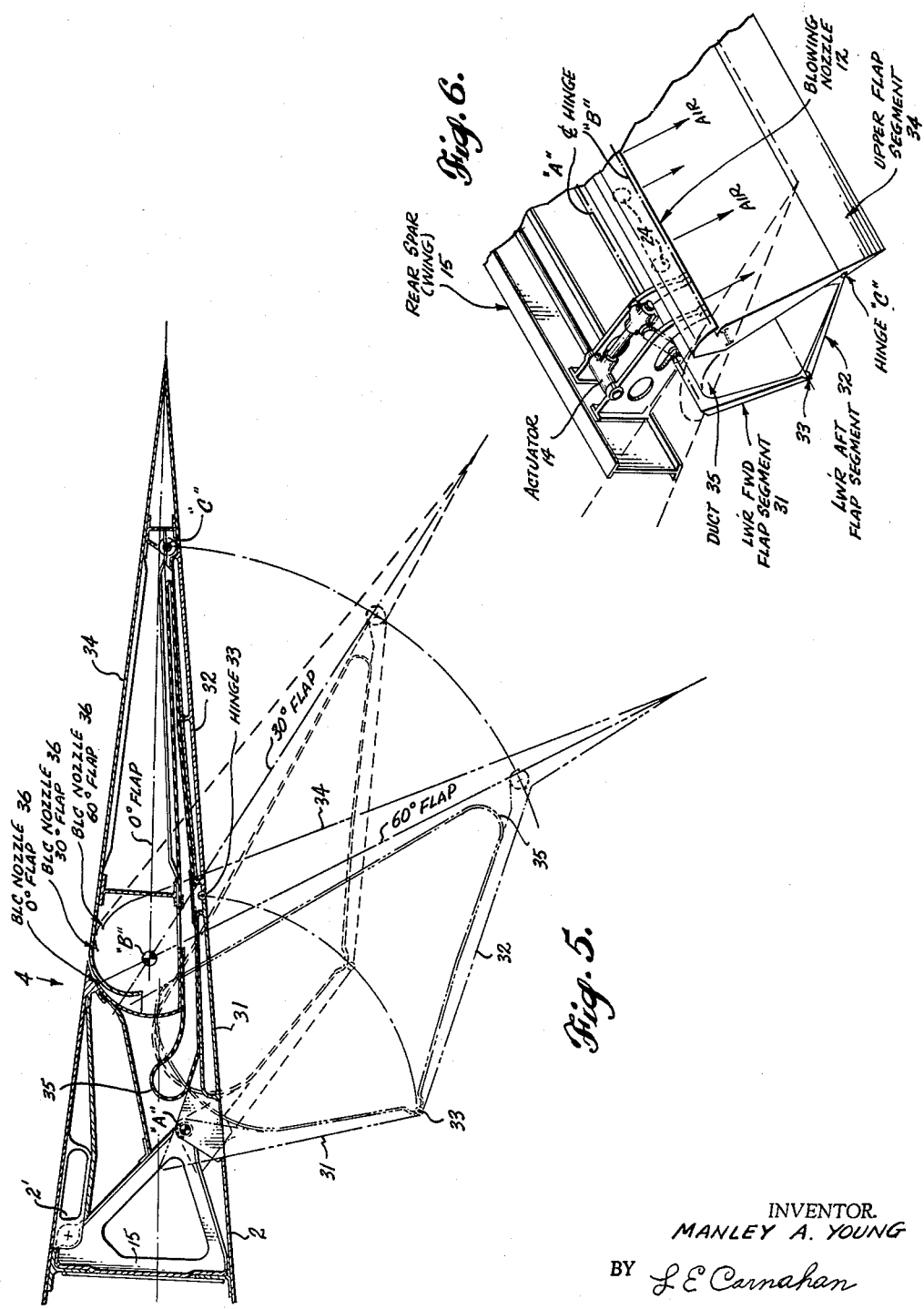

3,188,021
BOUNDARY LAYER CONTROL SYSTEM UTILIZING A COLLAPSIBLE DUCT POSITIONED IN A CONTROL SURFACE
Manley A. Young, Renton, Wash., assignor to The Boeing Company, Seattle, Wash., a corporation of Delaware
Filed Apr. 17, 1963, Ser. No. 273,771
8 Claims. (Cl. 244—42)

This invention relates to an aircraft control system, and more particularly to such a system where boundary layer control air is discharged over a control surface from a collapsible duct located in the control surface and wherein the system additionally functions as a pneumatic boost actuator.

It is well known in the art that control of boundary layer air over control surfaces can result in greatly improved aircraft performances. Removal of the relatively inert boundary layer air on such surfaces gives greater control over lift and drag forces, and is especially important during take-off, landing, and certain slow speed maneuvers of the aircraft. The provision of a suitable boundary layer control system is of particular importance during take-off and landing operations of high speed aircraft in that aircraft incorporating such a system are more operational with respect to those take-off and landing facilities and/or equipment which have been heretofore generally provided for aircraft of lower speed.

It has been proposed in the prior art to control the boundary layer by pulling the boundary layer inwardly from the surface by a suction force, this being accomplished, for example, by providing a perforated leading edge surface on a wing or control surface. Such arrangements have not proven to be entirely satisfactory due to the installation problems, and relatively complicated, heavy structure.

Other attempts have been to control the boundary layer by discharging air over the control surface from conduit and nozzle means positioned in the wing aft of the spar as illustrated by U.S. Patent 2,844,337 to R. B. MacArthur et al.

Another prior approach has been to discharge air over the control surface from a fixed diameter passageway and nozzle means positioned within the control surface as illustrated by U.S. Patent 2,920,844 to P. L. Marshall et al.

While each of the prior approaches illustrated by the above cited patent utilize supercirculation or blowing techniques to effect a reduction of aircraft minimum take-off and landing airspeed requirement they are limited by the flow area available due to the fixed diameter of the supply passageways, thus limiting the efficiency of such boundary layer control systems.

The instant invention is directed to a boundary layer control system positioned in the control surfaces and utilizes air supply means which are variable in size, thus allowing the cross sectional flow area to be proportional to the deflection of the control surface thereby providing the greatest flow area during periods when the requirements are the greatest while simultaneously extending the effective control surface chord resulting in additional control surface area and improved aerodynamics of the lower surface junction of the control surface and wing.

The boundary layer control system of the instant invention may be advantageously installed in aircraft having performance capabilities throughout a range of near-sonic and supersonic velocities and when properly installed and utilized the system functions to provide such aircraft with both improved cruising performance capabilities and with take-off and landing capabilities typically associated with aircraft of a lower performance type.

In addition to making essentially high speed performance aircraft more operational with respect to existing runways, landing strips, catapult launchers, carrier decks arresting gear, and the like, the boundary layer control system of the instant invention may be utilized to lower minimal required take-off and landing operations.

Therefore, an object of this invention is to provide a system for removing the boundary layer from control surfaces by air discharge.

A further object of the invention is to provide a boundary layer control system of great effectiveness, simplicity, and economical lightweight construction.

A still further object of the invention is to provide a boundary layer control systm wherein control air is discharged tangentially to the control surface.

Another object of the invention is to provide a system for removing the boundary layer from control surfaces by air discharge having a flow area proportional to the movement of the control surface while simultaneously functioning as a pneumatic boost for the control surface actuator.

Another object of the invention is to provide a system of removing the boundary layer from control surfaces by air discharge having a flow area proportional to the movement of the control surface and wherein the system simultaneously functions to extend the effective control surface area and provide actuator boost.

Another object of the invention is to provide a boundary layer control system utilizing supercirculation or blowing techniques which is especially well-suited for installation in aircraft basically of the high speed performance capability type.

Another object of the invention is to provide an aircraft boundary layer control system which utilizes high pressure, high velocity air as an operating medium.

Another object of the invention is to provide an aircraft boundary layer control system which may be selectively operated during flight to improve cruising performance characteristics of the aircraft.

Another object of the invention is to provide a boundary layer control system which will make its associated high speed aircraft more operational with respect to take-off and landing facilities, such as runway, landing strips, launching equipment, carrier flight decks, motion arresting devices, and the like usually provided for aircraft having lower speed performance capabilities.

Other objects of the invention not specifically set forth above will become readily apparent from the accompanying description and drawings in which:

FIG. 1 is a plan view of a typical high speed aircraft showing a portion of its control surfaces;

FIG. 2 is a schematic cross-sectional view of one embodiment of the invention and indicating the variable area duct feature as determined by different control surface positions;

FIG. 3 is a schematic view of the control system for the FIG. 2 embodiment;

FIG. 4 is a schematic cross-sectional view of a modified form of the FIG. 2 embodiment;

FIG. 5 is a schematic cross-sectional view of another embodiment of the invention; and FIG. 6 is a schematic view of a portion of the control system of FIG. 3 for a control surface utilizing the FIG. 5 embodiment.

The invention as illustrated in FIG. 2 involves a wing flap or control surface having an upper surface portion hinged adjacent its forward end to the wing and carrying within its rearward end a track element upon which the flap trailing edge portion is slidably mounted. The trailing edge portion is partially housed within the flap until the flap is deflected whereupon the said portion slidably extends rearward upon the track. The lower surface portion is pivoted at its forward end to the lower rear portion of the wing structure so as to act as a split flap, and has its rearward end pivoted to the said trailing edge portion. The split flap provides a continuous lower surface of the flap at the wing junction which results in improved aerodynamic flow over this region. Upon deflection of the flap a cavity is formed between the upper and lower flap surface portions, said cavity containing a collapsible duct which is connected to a source of air flow which will cause expansion thereof and because a passageway is provided between the duct and a nozzle located at the forward portion of the upper flap surface near the wing spoiler, the nozzle emits the supplied air flow over the flap surface resulting in a boundary layer control. The flow rate of air emitted is a function of the duct area which in turn is governed by the flap deflection. In addition, the internal pressure within the duct provides a pneumatic boost to the flap actuating system.

FIG. 1 shows a high speed aircraft comprising a fuselage 1, wing members 2 having control surfaces such as ailerons 3 and flaps 4 on the trailing edge, tail section 5, and engines 6 mounted between wings 2 and tail section 5.

The control surface (flap) 4 as shown in FIG. 2 consists of a lower flap segment 7, upper flap segment 8, common trailing edge segment 9, track 10, roller means 10′, bladder or collapsible duct 11, and boundary layer control nozzle 12.

In operation, lower flap segment 7 is actuated and pivots around hinge point "A" positioned on structure of wing 2. Actuation of segment 7 pulls upper flap segment 8 about hinge point "B" positioned on structure of wing 2 (see FIG. 3) as the flap 4 is deflected downwardly into the open position with respect to wing 2 and spoiler 2′. Trailing edge segment 9, upon deflection of segment 8, slides aft on track 10 and pivots around hinge point "C." As the flap 4 extends, it has an opening action between segments 7 and 8 and allows collapsible duct 11 to expand as it is filled with boundary layer control (B.L.C.) air from source 13 (see FIG. 3). The B.L.C. air is fed through collapsible duct 11 into the leading edge of flap 4 where it is directed tangentially to the upper surface of the flap at a point which is at, or in the vicinity of, the chordwise minimum pressure point for the flap upper surface aerodynamic pressure distribution. Upon retraction of flap 4, the air supply from source 13 is shut off thereby allowing the duct to collapse as flap segments 7 and 8 close.

As shown by legend in FIG. 2, Position A shows flap 4 as fully retracted, Position B as partially extended, and Position C as fully extended, thus showing the change in volume of duct 11 as being proportional to the deflection of flap 4 whereby the greatest flow rate of boundary layer control air is provided over the span of the flap during the position of flap 4 when the greatest flow is required, namely, the fully extended Position C.

Also, trailing edge segment 9, upon extending, extends the effective flap chord resulting in additional flap area. When extended, lower segment 7 also improves the aerodynamics of the flap-wing lower surface junction.

The internal pressure in collapsible duct 11 additionally aids in actuating the flap and in effect provides a pneumatic boost.

The control system for the FIG. 2 embodiment shown in FIG. 3 includes ball bearing screw type actuators 14 operatively positioned in support structure 15′, which is connected to wing rear spar 15 of wing 2, and to lower segment 7 of flap 4 at hinge point "A," segment 8 of flap 4 being operatively connected to structure 15′ at hinge point "B." Actuators 14 are drivingly connected by a torque shaft 16 to a hydraulic motor 17, said motor 17 being controlled by a flap valve control 18 which is actuated by cockpit control lever 19 via cables 20. Valve control 18 actuates a valve (not show) which controls pressure fluid from a source (not shown) to hydraulic motor 17, such hydraulic motor control system being well known in the art. Furthermore, it is common practice in the art to utilize a feedback from the motor to the valve in order to control selective positioning of the flap.

An electric motor 21 is operatively connected with shaft 16 and controlled by linkage mechanism 22 for auxiliary purposes such as partial or complete hydraulic system failure, thus acting as an electric standby drive unit.

Boundary layer control air from source 13 is supplied via conduct means 23 to collapsible duct 11 on to nozzle 12 via duct to nozzle ports 24 for discharge from nozzle 12 tangentially to the control surface or flap 4.

To further explain the duct size requirements in the air system shown, the diameter of air supply duct 23 is determined by the maximum airflow requirement for the greatest flap deflection. This means that a cross sectional flow area of this duct must be large enough to maintain an air velocity not greater than .35 Mach for maximum design airflows.

A cross sectional cut of the flow area of the collapsible flap duct 11 must also be large enough at each flap setting to give air velocities not greater than .35 Mach. This means that for the greatest flap deflection, where the airflow demands are the highest, the collapsible duct 11 must have a flow area at least as large as the flow area of air supply duct 23. The larger the supply duct flow area, the lower the flow velocities; the smaller the duct losses. Therefore, supply duct flow areas larger than required in the flap duct have further benefit.

The operation of the control system is conventional and an explanation thereof is deemed unnecessary.

While the control system has been illustrated and described with respect to the left hand flap, a similar actuator mechanism for the right hand flap is connected to shaft 16 as indicated by the legend in FIG. 3.

The modified form of the FIG. 2 embodiment as shown in FIG. 4 consists of a lower flap segment 7′, upper flap segment 8′, track 10′, cam roller 10″, collapsible duct 11′, and B.L.C. nozzle 12.

In operation, lower segment 7′ is actuated by means such as actuator 14 and pivots around hinge point "A." Actuation of segment 7′ pulls upper segment 8′ around hinge point "B" as the flap extends downwardly with respect to spoiler 2′ of wing 2. The cam roller 10″ slides aft in track 10′ which maintains the flap trailing edge relationship. As the flap 4 extends, it has an opening action between the lower and upper segments 7′ and 8′ due to the action of track 10′ and cam 10″ thereby allowing collapsible duct 11′ to expand as it is filled with B.L.C. air from source 13.

As in the FIG. 2 embodiment, the B.L.C. air is fed from source 13 through conduit means 23 into flap contained duct 11′ and thence into the flap leading edge to nozzle 12′ via duct to nozzle ports 24 and directed by nozzle 12 over the upper surface of flap 4. Again, upon retraction of the flap, air supply 13 is shut off allowing duct 11' to collapse as flap segments 7' and 8' close.

The elimination of trailing edge segment 9, as shown in the modified form FIG. 4 of the FIG. 2 embodiment, reduces the flap movement for actuation purposes while providing sufficient area for duct 11' to provide sufficient flow of B.L.C. air during the maximum requirement periods of operation and providing a pneumatic actuator boost effect.

The embodiment shown in FIG. 5 differs from that shown in FIGS. 2 and 4 in that the FIG. 5 configuration eliminates the sliding trailing edge features and provides greater duct areas and reduced duct losses. Also, because of a parallelogram effect of this configuration, the duct on pressurization adds more positive actuation boost than the FIGS. 2 and 4 embodiments.

The FIG. 5 flap consists of a forward lower flap segment 31, aft lower flap segment 32, a hinge 33 of the piano type interconnecting segments 31 and 32, upper flap segment 34, collapsible duct 35, and B.L.C. nozzle 36.

In operation, either lower flap segment 31 or upper segment 34 can be actuated but for description purposes segment 31 will be used. Lower segment 31 when actuated pivots around hinge point "A" positioned on wing 2 which in turn causes aft lower segment 32 to pivot about hinge point "C" which is attached to upper segment 34. Movement of segment 32 causes pull on segment 34 in a downward direction about hinge point "B." Because of the resulting shortening of the distance between hinge point "A" and hinge point "C" the three flap segments 31, 32 and 34 of the wing 2 take on a parallelogram shape which allows duct 35 to expand as it is filled with B.L.C. air from source 13 (FIG. 3).

The B.L.C. air is discharged from duct 35 over flap 4 in the same manner described above with respect to FIG. 2. As in the FIG. 2 embodiment, retraction of flap 4 causes the air supply to duct 35 to be shut off thus allowing the duct to collapse.

While the description has been directed to shutting off the air supply during retraction of the flaps, it is within the scope of this invention to utilize an air control mechanism which merely decreases the amount supplied to the collapsible duct thus allowing boundary layer control air to be directed over the control surfaces at all times, if desired, without sufficient pressure to effect actuation boost of the control surface.

The control system for the FIG. 5 embodiment, as fragmentarily shown in FIG. 6, operates in substantially the same manner as described above with respect to FIG. 3, the difference being in the action of the flap segments and the corresponding cross sectional area of the collapsible duct. Since the control mechanism for the FIG. 5 embodiment includes the same elements as that described in FIG. 3, further explanation is deemed unnecessary.

It has thus been shown that the instant invention provides a simple and effective aircraft boundary layer control system positioned in the control surfaces and utilizes collapsible duct means having a variable cross sectional flow area which is proportional to the deflection of the associated control surfaces thereby providing the greatest flow area for B.L.C. air where the volume requirements are greatest while simultaneously effecting a pneumatic boost for the control surface actuator.

While the invention as being specifically described with respect to wing flaps, it can be incorporated into any aircraft control surface, e.g., ailerons and elevators.

Although particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What I claim is:

1. In an aircraft having a fuselage, wing members, tail section, and a plurality of control surfaces with a control system therefor; a boundary layer control system comprising: collapsible duct means substantially contained within at least one movable aircraft control surface, said control surface being constructed of a plurality of elements including at least two spanwise surface panel segments having at one end thereof, a common junction for pivotal movement about a spanwise axis and at their opposite ends being pivotally connected in spaced apart relationship for movement, with respect to one another upon actuation thereof such as to form a cavity therebetween upon deflection of said control surface thereby allowing said collapsible duct means contained within said cavity to have a varying cross sectional area, fluid supply means adapted to be connected with said collapsible duct means, nozzle means operatively connected with said collapsible duct means and being positioned at the forward edge and extending over the span of said control surface for discharging fluid from said collapsible duct means over said control surface, whereby the extent of movement of said control surface elements determines the cross sectional area of said collapsible duct means and the flow rate of fluid discharged from said nozzle means.

2. The device defined in claim 1 wherein increase in cross sectional area of said collapsible duct means functions to effect a pneumatic boost to the movement of said control surface.

3. An aircraft having wing members, an air supply system, and a boundary layer control system connected to said wing members and to said air supply system, said wing members each being comprised of a relatively fixed forward portion, a movable flap member of variable cross-section configuration having a leading edge region located immediately aft of said fixed forward portion, said boundary layer control system including air discharge means of fixed height contained in each said flap member, collapsible duct means positioned within said flap member and connected to said discharge means and to said air supply system, said discharge means being contained in said flap members at said leading edge regions and being oriented with respect to said flap members upper surfaces, whereby air delivered from said supply system to said collapsible duct means is discharged tangent to said flap members and from said leading edge regions.

4. The aircraft defined in claim 3, wherein each said wing member has a spanwise line of chordwise minimum pressure points for the flap upper surface aerodynamic pressure distribution, said spanwise line being located adjacent the juncture of said fixed forward portion and said movable flap member, said discharge means being located along said spanwise line through the spanwise length of said movable flap member.

5. The aircraft defined in claim 3, wherein said collapsible duct means has a cross sectional area substantially proportional to the amount of variation of said flap members variable cross-section configuration.

6. The aircraft defined in claim 5, wherein said discharge means is located along the spanwise length of said movable flap member.

7. The apparatus defined in claim 5, wherein increase in cross sectional area of said collapsible duct means functions to effect a pneumatic boost to the movement of said flap members.

8. In a blowing type boundary layer control system installed in an aircraft, in combination: a wing member, a movable expansible flap member connected to said wing member, said flap member being constructed of a plurality of elements including at least two spanwise surface panel segments having at one end thereof a common junction for pivotal movement about a spanwise axis and at their opposite ends being pivotally connected to said wing member in spaced apart relationship for movement with respect to one another upon actuation thereof such as to form a cavity therebetween upon deflection of said flap member, a collapsible duct means substantially contained within said cavity and being varied in cross-sectional area in proportion to deflection of said flap member, a fluid discharge means including nozzle means connected to said duct means and being oriented with respect to the upper surface of said flap member such that the nozzle discharge angle varies as the flap member is deflected with respect to said wing member whereby fluid is discharged from said collapsible duct means tangent to the outer surface of said flap member.

References Cited by the Examiner

UNITED STATES PATENTS

| | | | |
|---|---|---|---|
| 2,142,123 | 1/39 | Fahrney | 244—12 |
| 2,476,001 | 7/49 | Stalker | 244—4 X |
| 2,920,844 | 1/60 | Marshall et al. | 244—12 |
| 2,928,627 | 3/60 | Johnson | 244—42 |
| 3,126,173 | 3/64 | Alvarez-Calderon | 244—42 |
| 3,128,966 | 4/64 | Alvarez-Calderon | 244—42 |

FOREIGN PATENTS

| | | |
|---|---|---|
| 1,003,096 | 11/51 | France. |
| 1,239,330 | 7/60 | France. |

MILTON BUCHLER, *Primary Examiner.*